United States Patent [19]

Wike, Jr. et al.

[11] Patent Number: 5,719,385

[45] Date of Patent: Feb. 17, 1998

[54] OPTICAL SCANNER HAVING MULTI-LINE AND SINGLE-LINE SCANNING MODES

[75] Inventors: Charles K. Wike, Jr., Sugar Hill; William M. Belknap, Lawrenceville; Thai-Bao Hoang Kien, Norcross; Joseph M. Lindacher, Duluth, all of Ga.

[73] Assignee: NCR Corporation, Dayton, Ohio

[21] Appl. No.: 569,540

[22] Filed: Dec. 8, 1995

[51] Int. Cl.⁶ .................................................. G06K 7/10
[52] U.S. Cl. ................................... 235/467; 235/462
[58] Field of Search ............................. 235/467, 462, 235/436, 455, 472, 454, 470, 469; 250/205

[56] References Cited

U.S. PATENT DOCUMENTS

| | | | |
|---|---|---|---|
| 3,718,761 | 2/1973 | Myer | 178/7.6 |
| 3,774,014 | 11/1973 | Berler | 235/61.11 E |
| 4,282,431 | 8/1981 | Anthony, Jr. et al. | 250/236 |
| 4,418,276 | 11/1983 | Yatsunami | 235/462 |
| 4,795,224 | 1/1989 | Goto | 350/6.3 |
| 4,797,551 | 1/1989 | Ferrante | 250/234 |
| 4,871,904 | 10/1989 | Metlitsky et al. | 235/467 |
| 4,967,076 | 10/1990 | Schuhmacher et al. | 250/236 |
| 4,971,410 | 11/1990 | Wike, Jr. et al. | 350/6.5 |
| 5,015,833 | 5/1991 | Shepard et al. | 235/472 |
| 5,138,140 | 8/1992 | Siemiatkowski et al. | 235/462 |
| 5,151,581 | 9/1992 | Krichever et al. | 235/462 |
| 5,175,421 | 12/1992 | Harris | 235/467 |
| 5,179,271 | 1/1993 | Lindacher et al. | 235/467 |
| 5,221,832 | 6/1993 | Collins, Jr. et al. | 235/467 |
| 5,235,167 | 8/1993 | Dvorkis et al. | 235/462 |
| 5,241,164 | 8/1993 | Pavlidis et al. | 235/462 |
| 5,278,398 | 1/1994 | Pavlidis et al. | 235/462 |
| 5,319,181 | 6/1994 | Shellhammer et al. | 235/462 |
| 5,354,977 | 10/1994 | Roustaei | 235/472 |
| 5,365,048 | 11/1994 | Komiya et al. | 235/462 |
| 5,371,347 | 12/1994 | Plesko | 235/467 |
| 5,378,881 | 1/1995 | Adachi | 235/462 |
| 5,504,316 | 4/1996 | Bridgelall et al. | 235/470 X |
| 5,528,022 | 6/1996 | Nakazawa | 235/462 |

FOREIGN PATENT DOCUMENTS

| | | | |
|---|---|---|---|
| 2238816 | 9/1973 | Germany . | |
| 3266089 | 11/1991 | Japan | 235/462 |

*Primary Examiner*—Donald T. Hajec
*Assistant Examiner*—Thien Minh Le
*Attorney, Agent, or Firm*—Paul W. Martin

[57] ABSTRACT

An optical scanner for reading two-dimensional bar code labels. A rotating reflector directs a laser beam towards a plurality of pattern mirrors during a first mode of operation to produce a plurality of different scan lines forming a multi-line scan pattern for collecting light from an article having a one-dimensional bar code label, and directs the laser beam towards one of the pattern mirrors during a second mode of operation to produce a single scan line for collecting light from an article having a two-dimensional bar code label. A single tilted mirror assembly, having a motor for rotating a drive shaft and a mirror mounted at an angle to the drive shaft, reflects the plurality of different scan lines towards the article having the one-dimensional bar code label during the first mode of operation, and reflects the one scan line from the scan module towards the article having the two-dimensional bar code label during the second mode of operation.

6 Claims, 2 Drawing Sheets

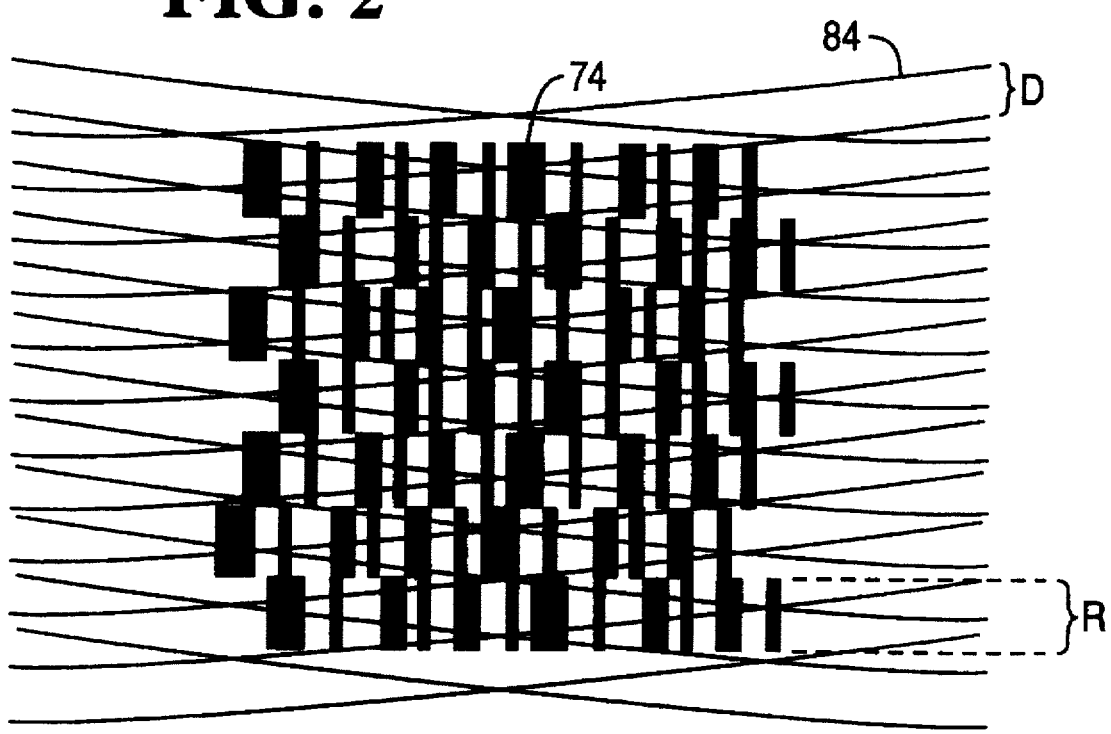

OPTICAL SCANNER HAVING MULTI-LINE AND SINGLE-LINE SCANNING MODES

CROSS-REFERENCE TO RELATED APPLICATION

The present application is related to commonly-assigned and co-pending U.S. application Ser. No. 08/084,779.

BACKGROUND OF THE INVENTION

The present invention relates to optical scanners, and more specifically to an optical scanner having multi-line and single-line scanning modes.

The predominant bar code label used today is a one-dimensional bar code label, characterized by a plurality of dark and light parallel lines of varying width. Such bar code labels may comply with the UPC standard. One-dimensional bar code labels are characterized by data redundancy, i.e., they yield the same information when read from either end along a direction substantially perpendicular to the parallel lines.

A relatively new and less-used bar code label is a two-dimensional bar code label, typically characterized by a plurality of different rows of dark and light parallel lines of varying width stacked on top of each other. Although, each row is typically not a one-dimensional bar code label. The information in the rows are linked by a common scheme which allows the entire bar code label to be decoded when less than all of the rows have been scanned. Such bar code labels may comply with the PDF, Supercode, or other standard. Two-dimensional bar code labels do not have the data redundancy of one-dimensional bar code labels.

Optical scanners are well known for their usefulness in retail checkout and inventory control. There are two types of optical scanners: multi-line and single-line scanners, where multi-line scanners produce multiple scan lines and single-line scanners produce one scan line. Multi-line scanners are designed for scanning a bar code label whose orientation over the scanner is random. Single-line scanners are used in environments in which the orientation of the bar code with respect to the single scan line is determined by a user.

Multi-line optical scanners generally employ a laser diode, the light from which is focused and collimated to produce a scanning beam. A reflective spinner directs the beam against a plurality of stationary mirrors, and collects the beam after it is reflected by a bar code label. A motor rotates the reflective spinner, and a detector receives the returning beam. The pattern produced by such a scanner is characterized by lines oriented at various angles to one another.

An example of a multi-line scanner is disclosed in commonly-assigned U.S. Pat. No. 5,256,865 to Wike, Jr. et al., entitled "Automatic Sensing And Programming Circuit And Programming Method For Optical Scanners", and commonly-assigned U.S. Pat. No. 5,221,832 to Collins, Jr. et al., entitled "Raster Variation Method For Omnidirectional Optical Scanners". These patents are hereby incorporated by reference.

Single-line optical scanners may employ light-emitting diodes or lasers, and commonly have the shape of a wand or gun. Single-line scanners are particularly useful in reading two-dimensional bar code labels. For such purposes, single-line scanners may employ reciprocal oscillation, counter-rotating mirrors, or galvanometer-driven deflection mirrors to automatically raster the single scan line across the two-dimensional bar code label. Those that do not automatically raster the single scan line must be manually oriented across each row of the two-dimensional bar code label by an operator.

Therefore, it would be desirable to provide an optical scanner having both a multi-line mode of operation and a single-line mode of operation for users that do not wish to use two separate scanners. It would also be desirable to provide such a multi-purpose scanner with the ability to read two-dimensional bar code labels.

SUMMARY OF THE INVENTION

In accordance with the teachings of the present invention, an optical scanner having multi-line and single-line scanning modes is provided.

The optical scanner includes a plurality of stationary pattern mirrors and a rotating reflector rotated by a first scanner motor. The rotating reflector directs a laser beam towards the pattern mirrors during a first mode of operation to produce a plurality of different scan lines forming a multi-line scan pattern for collecting light from an article having a one-dimensional bar code label to be scanned. During a second mode of operation, the rotating reflector directs the laser beam towards one of the pattern mirrors to produce a single scan line for collecting light from an article having a two-dimensional bar code label to be scanned. A single tilted mirror assembly includes a second scanner motor for rotating a drive shaft and a mirror mounted at an angle to the drive shaft. The tilted mirror assembly reflects the plurality of different scan lines from the scan module towards the article having the one-dimensional bar code label during the first mode of operation, and reflects the one scan line from the scan module towards the article having the two-dimensional bar code label during the second mode of operation.

The optical scanner also includes a sensor which senses the position of the first motor, a switch which provides power to the laser, and a controller coupled to the sensor and the switch which, during the second mode of operation, applies power to the laser only while the position of the first motor causes the laser beam to strike the one pattern mirror.

The optical scanner further includes an item sensor coupled to the controller, and another switch which provides power to the first motor and the second motor when the item sensor senses an item.

A method for reading a two-dimensional bar code label is also disclosed. A scan module produces a single scan line during a single scan line mode of operation. The single scan line is rastered using the tilted mirror assembly. A speed ratio of the motor to another motor within the scan module is adjusted so that raster positions of the single scan line are separated by a predetermined minimum distance.

It is accordingly an object of the present invention to provide an optical scanner having multi-line and single-line scanning modes.

It is another object of the present invention to provide an optical scanner for scanning two-dimensional bar code labels.

It is another object of the present invention to provide an optical scanner for scanning two-dimensional bar code labels by rastering a single scan line across the two-dimensional bar code label.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 shows a raster scanning pattern wherein the scan lines are separated from each other by a predetermined distance.

DETAILED DESCRIPTION OF THE PREFERRED EMBODIMENT

Figure 1:
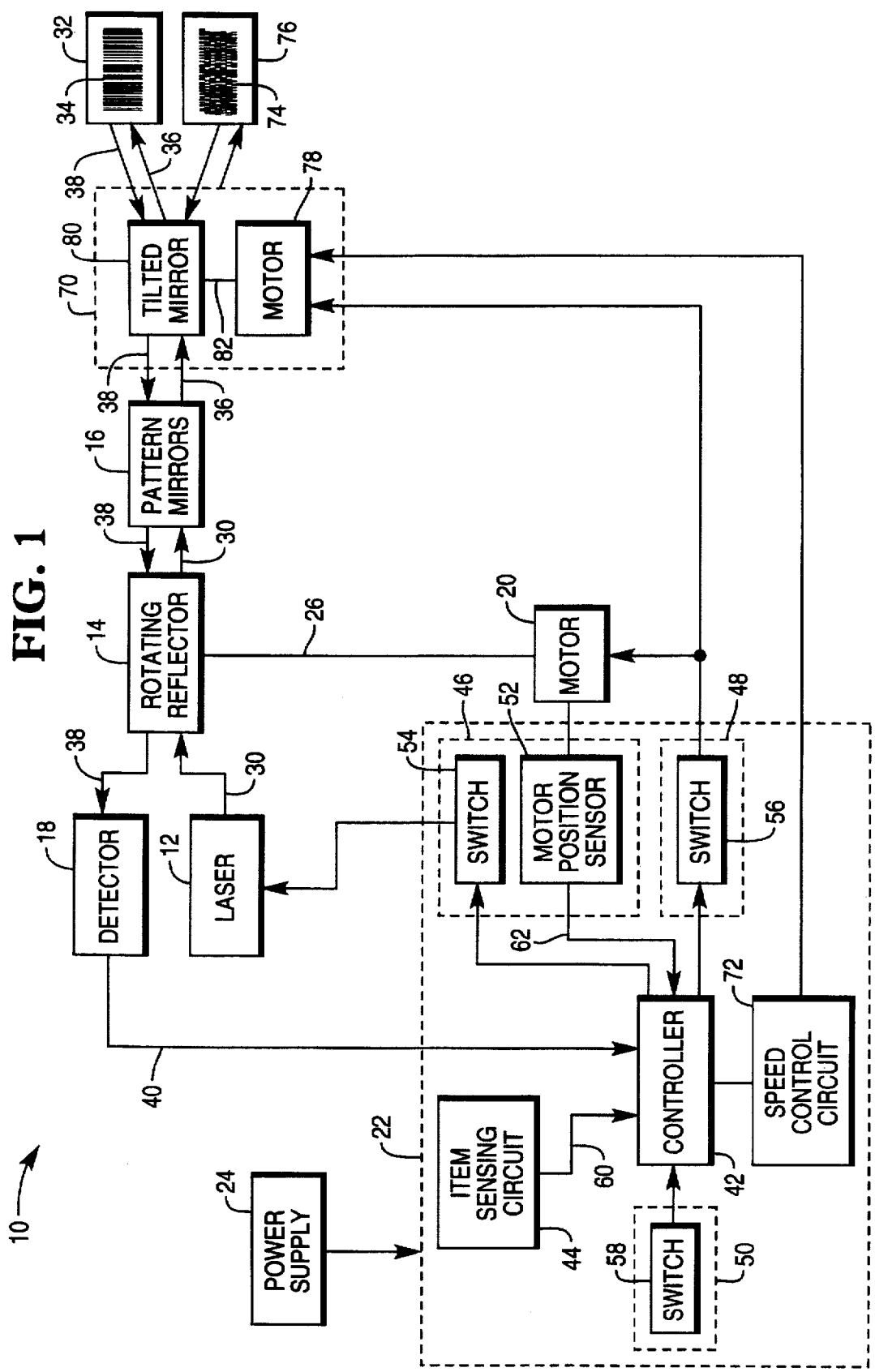
FIG. 1 is a block diagram of the optical scanner of the present invention.

Referring now to FIG. 1, multi-line and single line producing optical scanner 10 includes laser 12, rotating reflector 14, pattern mirrors 16, detector 18, motor 20, control circuit 22, and power supply 22.

Laser 12 includes a laser diode or other suitable laser source. A focusing lens or lenses and a collimating aperture are also preferably used to produce a focused and collimated laser beam 30.

Rotating reflector 14 directs beam 30 towards pattern mirrors 16, and directs light 38 reflected from item 32 towards detector 18. Rotating reflector 14 may include a mirrored polygon spinner, or a mirrored collecting surface having an aperture for passing beam 22, as disclosed in the incorporated Wike, Jr., and Collins, Jr., patents.

Pattern mirrors 16 produce one or more scanning lines 36, which impact item 32 for illuminating bar code label 34. Pattern mirrors 16 direct reflected light 38 towards rotating reflector 14.

Detector 18 converts reflected light 38 into electrical signals 40 based upon the intensity of reflected light 38.

Motor 20 rotates rotating reflector 14. Motor 20 includes shaft 26 upon which rotating reflector 14 is mounted.

Control circuit 22 applies power from power supply 24 to motor 20 and laser 12, and decodes information contained within bar code label 34 from electrical signals 40.

Control circuit 22 includes controller 42, item sensing circuit 44, laser power control circuit 46, motor power control circuit 48, and mode control circuit 50.

Controller 42 decodes information contained within bar code label 34, and controls laser power control circuit 46 and motor power control circuit 48.

Item sensing circuit 44 senses when item 32 is within the scan volume of scanner 10. Item sensing circuit 44 preferably includes a photodiode that produces a signal 60 indicative of the background light intensity. Controller 42 removes power from laser 12 and motor 20 when background light intensity is high (i.e., no item or person is in the scan volume for a predetermined time period) and applies power when background light intensity is below a predetermined threshold. Motion sensing circuitry which senses changes in background light intensity may also be employed. Alternately, item sensing circuit 44 may include the infrared transmitting and receiving diodes disclosed in the incorporated reference by Wike, Jr., et al.

Laser power control circuit 46 controls the application of power to laser 12 and includes motor position sensor 52 and switch 54.

Motor position sensor 52 generates signal 62 which indicates that motor 20 is in a predetermined position during its rotation. Motor position sensor 52 may be a Hall sensor, but other position sensors are also envisioned by the present invention. For example, a position indicating reflector may be mounted on pattern mirrors 16 (e.g., on a facet edge) and illuminated by the laser beam when reflector 14 reaches a predetermined point in its rotation. A position indicating detector senses the light reflected from the position indicating reflector. Laser power control circuit 46 then activates laser 12 during a predetermined time period (i.e., the time required to illuminate one facet of a mirrored polygon).

Controller 42 activates laser 12 by closing switch 54 to produce a single scan line when scanner 10 is in the single-line mode of operation. The signal from motor position sensor 52 is ignored by controller 42 when scanner 10 is in the multi-line mode of operation.

Switch 54 applies power to laser 12 upon receiving a control signal from controller 42. Controller 42 closes switch 54 and switch 56 to turn on laser 12, motor 20, and motor 78 when signal 60 indicates that an item, or a person, or a motion of a person or item is detected by item sensing circuit 44. In the single-line mode of operation, switch 54 is preferably closed only during the time required for the laser beam to cross one of pattern mirrors 16.

Switch 58 places controller 42 in the single-line or multi-line mode of operation. Switch 58 produces signal 50 when closed. Switch 58 may be a mechanical, electronic, or optical switch controlled by an operator. Alternatively, switch 58 may be replaced by scanning a program bar code label to control controller 42. Signal 62 from motor position sensor 52 instructs controller 42 when to turn on and off laser 12.

Motor power control circuit 48 includes switch 56. Switch 56 applies power to motor 20 and motor 78 upon receiving a control signal from controller 42. In both the multi-line and single-line modes of operation, controller 42 closes switch 56 when signal 60 is received.

Mode control circuit 50 changes the mode of operation of scanner 10 between multi-line scanning and single-line scanning. Mode control circuit 50 preferably includes switch 58 which is activated by a user.

The preferred embodiment of scanner 10 also includes tilted mirror assembly 70 and speed control circuit 72 for the purpose of making the scan pattern of scanner 10 more omnidirectional in the multi-line mode of operation, and for also scanning two-dimensional bar code label 74 on item 76 when scanner 10 is in the single-line mode of operation.

Tilted mirror assembly 70 includes motor 78, having drive shaft 82, and rotating reflecting mirror 80, which is offset-mounted to motor shaft 82. Motor power control circuit 48 also controls power to motor 78. Preferably, motor 78 and motor 20 rotate in opposite directions. Motor shaft 82 is preferably oriented at an angle to drive shaft 82 of forty-five degrees. Tilted mirror assembly 70 rotates the pattern from pattern mirrors 16 about the pattern's effective center to produce a highly dense multi-line scan pattern in the multi-line mode of operation. Tilted mirror assembly 70 is also discussed in the incorporated patent to Wike, Jr., et al.

In the multi-line mode of operation, speed control circuit 72 adjusts the speed ratio of motor 20 to motor 78 to optimize the reading ability of scanner 10 for various bar code label aspect ratios, as discussed in the incorporated patent to Collins, Jr., et al. For high aspect ratio bar code labels, speed control circuit 72 increases the speed ratio between motor 20 and motor 78 by decreasing the speed of motor 78 by a predetermined amount. For other bar code labels, speed control circuit 72 decreases the speed ratio between motor 20 and motor 78 by increasing the speed of motor 78 by the predetermined amount. Preferably, controller 42 controls speed control circuit 72, and programming bar code labels are employed to change the speed ratio.

In the single-line mode of operation, two-dimensional bar code label 74 is oriented by an operator in a location similar to that in FIG. 2. Tilted mirror assembly 70 rasters the single scan line across each row of two-dimensional bar code label 74. Each occurrence of the single scan line is at a different position in space for each revolution of motor 20, thus creating raster scan pattern 84. Raster pattern 84 has the appearance of a multiple scan line pattern when the different occurrences of the single scan line are collectively viewed (FIG. 2).

Rastering provides scanner 10 with the ability to automatically scan two-dimensional bar code label 74. Two-dimensional bar code label 74 has a plurality of rows each having a width R. Speed control circuit 72 adjusts the space D between the occurrences of the single scan line to ensure that a single scan line crosses as much of a row of two-dimensional bar code label 74 as possible. Preferably, space D is set to a minimum value.

Since two-dimensional bar code label 74 is oriented by the operator, the greater angular coverage provided by larger spaces D is of little value. Although, when two-dimensional bar code label 74 is not properly oriented, a greater space D may ensure that two-dimensional bar code label 74 is read.

Sophisticated algorithms known in the art along with the known inherent structure of two-dimensional bar code label 74 allows controller 42 to decode two-dimensional bar code label 74 from partial row scans.

Scanner 10 is particularly useful in a vertical orientation as a "presentation" scanner, rather than in a horizontal orientation as a countertop scanner, although countertop operation is also envisioned by the present invention. As discussed in the incorporated patent to Wike, Jr. et al., the preferred embodiment of scanner 10 may be operated in a hands-free position as a presentation scanner, or in a hand-held position as a hand-held scanner. Both the multi-line and single-line modes of operation may be employed when scanner 10 is used as either a hand-held or hands-free scanner.

Although the present invention has been described with particular reference to certain preferred embodiments thereof, variations and modifications of the present invention can be effected within the spirit and scope of the following claims.

We claim:

1. An optical scanner comprising:

a scan module including a plurality of stationary pattern mirrors, and a rotating reflector rotated by a first scanner motor for directing a laser beam towards the pattern mirrors during a first mode of operation to produce a plurality of different scan lines forming a multi-line scan pattern and for collecting light from an article having a one-dimensional bar code label to be scanned, and for directing the laser beam towards one of the pattern mirrors during a second mode of operation to produce a single scan line and for collecting light from an article having a two-dimensional bar code label to be scanned; and a single tilted mirror assembly, having a second scanner motor for rotating a drive shaft and a mirror mounted at an angle to the drive shaft for reflecting the plurality of different scan lines from the scan module towards the article having the one-dimensional bar code label during the first mode of operation, and for reflecting the one scan line from the scan module towards the article having the two-dimensional bar code label during the second mode of operation.

2. The optical scanner as recited in claim 1, wherein the plurality of different scan lines form a star-shaped pattern having a center which is rotated by the single tilted mirror assembly to form a highly dense multi-line scan pattern.

3. The optical scanner as recited in claim 1, further comprising:

a sensor which senses the position of the first motor;

a switch which provides power to the laser; and a controller coupled to the sensor and the switch which, during the second mode of operation, applies power to the laser only while the position of the first motor causes the laser beam to strike the one pattern mirror.

4. The optical scanner as recited in claim 3, further comprising:

an item sensor coupled to the controller; and another switch which provides power to the first motor and the second motor;

wherein the controller applies power to the laser, the first motor, and the second motor when the item sensor senses an item.

5. The optical scanner as recited in claim 1, further comprising:

a switch coupled to the controller which selects the first or the second mode of operation.

6. A method for reading a two-dimensional bar code label comprising the steps of:

(a) providing a scan module which produces a single scan line during a single scan line mode of operation;

(b) rastering the single scan line, including the substeps of (b-1) providing a tilted mirror assembly, having a motor for rotating a drive shaft and a mirror mounted at an angle to the drive shaft for reflecting the single scan line from the scan module towards the article having the two-dimensional bar code label; and (b-2) adjusting a speed ratio of the motor to another motor within the scan module which rotates a rotating reflector so that raster positions of the single scan line are separated by a predetermined minimum distance.

* * * * *